United States Patent
Inoue (10) Patent No.: US 11,603,924 B2
(45) Date of Patent: Mar. 14, 2023

(54) POWER TRANSMISSION CONTROL DEVICE

(71) Applicant: AISIN AW CO., LTD., Anjo (JP)

(72) Inventor: Hiroki Inoue, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 937 days.

(21) Appl. No.: 16/471,800

(22) PCT Filed: Dec. 27, 2017

(86) PCT No.: PCT/JP2017/047051
§ 371 (c)(1),
(2) Date: Jun. 20, 2019

(87) PCT Pub. No.: WO2018/124220
PCT Pub. Date: Jul. 5, 2018

(65) Prior Publication Data
US 2020/0096096 A1 Mar. 26, 2020

(30) Foreign Application Priority Data
Dec. 27, 2016 (JP) .............................. JP2016-253216

(51) Int. Cl.
*F16H 59/74* (2006.01)
*F16H 59/68* (2006.01)
*F16H 59/70* (2006.01)

(52) U.S. Cl.
CPC ..... *F16H 59/74* (2013.01); *F16H 2059/6853* (2013.01); *F16H 2059/706* (2013.01); *F16H 2059/743* (2013.01)

(58) Field of Classification Search
CPC ....... F16H 2059/6853; F16H 2059/706; F16H 2059/743
See application file for complete search history.

(56) References Cited

U.S. PATENT DOCUMENTS 9,038,493 B2 * 5/2015 Iwasaki ................... F16D 48/06
74/335
2016/0230881 A1 8/2016 Koga et al.

FOREIGN PATENT DOCUMENTS

CN 102016360 B * 10/2013 ......... F16H 61/0403
JP 3709955 B2 10/2005
(Continued)

OTHER PUBLICATIONS

U.S. Appl. No. 16/471,597, filed Jun. 20, 2019, Manta et al.
(Continued)

*Primary Examiner* — Vicky A Johnson
(74) *Attorney, Agent, or Firm* — Buchanan Ingersoll & Rooney PC (57) ABSTRACT

A power transmission control device acquires rotation speed information of an idle gear corresponding to a target engagement member and rotation speed information of a sleeve corresponding to an engagement member, sets one rotation speed changeable by a power source as a synchronization side rotation speed, sets the other rotation speed as a target synchronization side rotation speed, allows a differential rotation between the synchronization side rotation speed and the target synchronization side rotation speed to match a predetermined differential rotation by changing the synchronization side rotation speed using the power source after a power transmission releasing state is selected due to a gear changing request, performs an engagement operation, inverts a sign of the predetermined differential rotation, and switches to the power transmission state while allowing the differential rotation to match the predetermined differential rotation of which the sign is inverted.

11 Claims, 6 Drawing Sheets

(56) References Cited

FOREIGN PATENT DOCUMENTS

| | | |
|---|---|---|
| JP | 2013-095255 A | 5/2013 |
| JP | 2016-043792 A | 4/2016 |
| WO | WO 2015/068584 A1 | 5/2015 |

OTHER PUBLICATIONS

U.S. Appl. No. 16/471,599, filed Jun. 20, 2019, Manta et al.
U.S. Appl. No. 16/471,763, filed Jun. 20, 2019, Shimizu et al.
International Search Report (Form PCT/ISA/210) dated Mar. 20, 2018, by the Japanese Patent Office in corresponding International Application No. PCT/JP2017/047051. (2 pages).
Notification of Transmittal of Translation of the International Preliminary Report on Patentability (Form PCT/IB/338 and PCT/IB/373) dated Jul. 11, 2019 and the Written Opinion of the International Searching Authority (Form PCT/ISA/237) dated Mar. 20, 2018, by the International Bureau of WIPO in corresponding International Application No. PCT/JP2017/047051. (16 pages).

* cited by examiner

WHEN N1 = N2 AND TIPS OF IDLE GEAR
AND SLEEVE OVERLAP EACH OTHER,
ENGAGEMENT DOES NOT OCCUR.

POWER TRANSMISSION CONTROL DEVICE

TECHNICAL FIELD

The present invention relates to a power transmission control device in a vehicle which is an AMT that performs gear changing control by an actuator and does not have a synchronization mechanism in a transmission.

BACKGROUND ART

In recent years, there have been an increasing number of vehicles using automated manual transmissions (AMTS) that control gear stages by actuators and a transmission (a non-synchronous transmission) which is an AMT and does not have a synchromesh mechanism with a synchronizer ring has been developed. For a gear changing operation of the vehicle employing such an actuator, a sleeve which fixes an idle gear of a current gear stage to a rotation shaft so as not to be relatively rotatable is slid by using power generated from the actuator so that the sleeve is separated from the idle gear of the current gear stage so as to allow the idle gear and the rotation shaft to be relatively rotated. Further, in order to switch to a next gear stage, the sleeve which is moved to a neutral position is slide toward an idle gear of the next gear stage so that the sleeve is engaged with the idle gear of the next gear stage and is fixed to the rotation shaft so as not to be relatively rotatable. In this way, the gear changing operation is completed. In the case of the non-synchronous transmission, when the sleeve is located at a neutral position, a differential rotation is eliminated by performing a process of synchronizing a rotation speed of the idle gear with a rotation speed of the sleeve at the time of switching the gear stage. Accordingly, the idle gear and the sleeve smoothly engage with each other.

Patent Literature 1 describes an electric transmission device capable of engaging a sleeve with a gear without repeating a gear changing operation from the beginning only by performing an engagement operation again when the sleeve cannot engage with the gear.

CITATION LIST

Patent Literature

Patent Literature 1: JP 3709955 B2

SUMMARY OF INVENTION

Technical Problem

In the electric transmission device described in Patent Literature 1, the sleeve is allowed to engage with the gear without repeating the gear changing operation from the beginning only by performing the engagement operation again when the sleeve cannot engage with the gear. However, since the engagement operation is repeated by strengthening or weakening torque relating to the movement of the sleeve, there is concern that a driver feels uncomfortable since it takes a long time until the engagement operation is completed. Further, since a process of allowing the rotation speed of the sleeve to match the rotation speed of the gear is not performed, there is concern that an excessive load may be applied to the sleeve and the gear.

Figure 6:
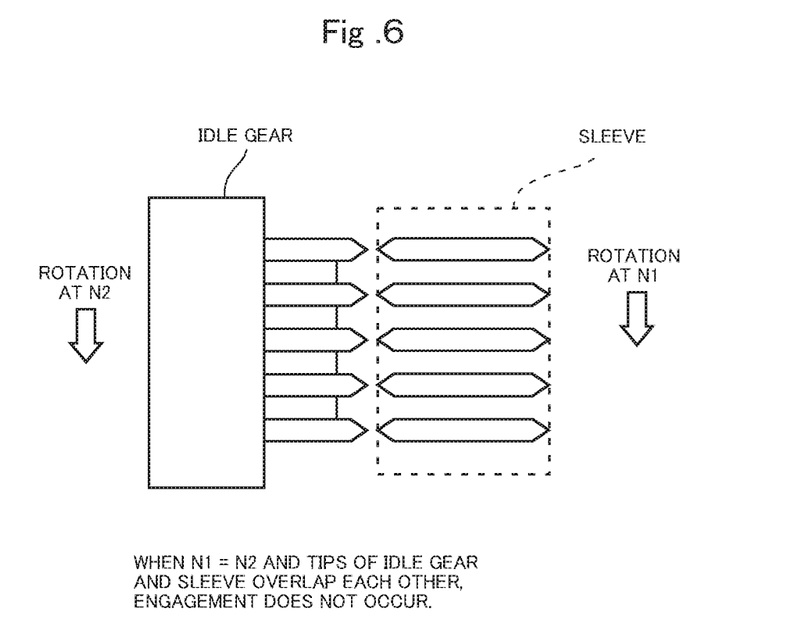
FIG. 6 is an explanatory diagram illustrating a state immediately before an idle gear corresponding to a target engagement member of a non-synchronous transmission engages with a sleeve corresponding to an engagement member.

FIG. 6 is an explanatory diagram illustrating a state immediately before an idle gear engages with a sleeve in a non-synchronous transmission. In a non-synchronous transmission type vehicle, as illustrated in FIG. 6, when a sleeve which rotates together with a rotation shaft and is slidable in an axial direction rotates at a rotation speed N1 and an idle gear which is provided to be rotatable relative to the rotation shaft rotates at a rotation speed N2, for example, the rotation speed of the rotation shaft of the sleeve is controlled so that N1 is equal to N2 by a driving force of an engine or a motor generator and the sleeve is moved to engage with the idle gear at a stage in which N1 is equal to N2. In this way, the gear engagement operation is completed. However, as described in FIG. 6, when N1 is equal to N2 and a tooth tip of the sleeve accurately matches a tooth tip of the idle gear, this matching state is maintained. For this reason, a problem arises in that the sleeve does not engage with the gear even when the sleeve is moved in this state. Further, when the sleeve is forcedly engaged with the gear in the state of FIG. 6, a problem arises in that a driver feels uncomfortable due to a collision sound generated between the tips of the sleeve and the gear.

The invention has been made in view of the above-described problems and an object of the invention is to provide a power transmission control device capable of reliably engaging gears in a transmission by a non-synchronous transmission.

Solution to Problem

A power transmission control device according to the invention includes: a first rotation shaft; a power source which is provided to adjust a rotation speed of the first rotation shaft; a second rotation shaft which rotates together with an axle; a first rotation speed detection unit which detects the rotation speed of the first rotation shaft; a second rotation speed detection unit which detects a rotation speed of the second rotation shaft; an engagement member that rotates together with anyone shaft of the first rotation shaft and the second rotation shaft and is provided to be movable with respect to the one shaft in an axial direction; a target engagement member that is provided in the one shaft to be relatively rotatable and rotates together with the other shaft of the first rotation shaft and the second rotation shaft; an actuator which is operated to move the engagement member in the axial direction; and a control unit which is able to perform a power transmission rotation speed calculation process of calculating a power transmission rotation speed corresponding to the rotation speed of the first rotation shaft at the time of establishing a power transmission operation between the engagement member and the target engagement member on the basis of the rotation speed of the second rotation shaft detected by the second rotation speed detection unit at the time of establishing the power transmission operation between the engagement member and the target engagement member, a differential rotation calculation process of calculating a differential rotation corresponding to a rotation speed difference obtained by subtracting the power transmission rotation speed calculated in the power transmission rotation speed calculation process from the rotation speed of the first rotation shaft detected by the first rotation speed detection unit, and a synchronization engagement control process of controlling a rotation speed of the power source so that the differential rotation calculated in the differential rotation calculation process matches a predetermined differential rotation and operating the actuator so that the power transmission operation between the engagement member and the target engagement member is established after the differential rotation matches the predetermined differential rotation, wherein an engagement/disengagement state between the engagement member and the target engagement member includes at least a power transmission releasing state in which no contact occurs between the engagement member and the target engagement member, a power transmission state in which a contact between the engagement member and the target engagement member occurs and the power transmission operation is established, and a contact state in which a contact between the engagement member and the target engagement member occurs, but the power transmission operation is not established, and wherein in a case in which the actuator is operated so as to switch the power transmission releasing state to the power transmission state, the control unit allows the differential rotation to match the predetermined differential rotation before the transition to the contact state during the synchronization engagement control process, and changes the predetermined differential rotation before the transition to the power transmission state after the transition to the contact state and allows the differential rotation to match the changed predetermined differential rotation.

Further, the power transmission control device according to the invention is the power transmission control device according to claim 1, wherein in a case in which the actuator is operated so as to switch the power transmission releasing state to the power transmission state, the control unit allows the differential rotation to match the predetermined differential rotation set to a value other than zero before the transition to the contact state in the synchronization engagement control process, and inverts a sign of the predetermined differential rotation before the transition to the power transmission state after the transition to the contact state and allows the differential rotation to match the predetermined differential rotation of which the sign is inverted.

Further, in the power transmission control device according to the invention, the control unit is able to perform an acceleration/deceleration request determination process of determining an acceleration request corresponding to a request of accelerating a vehicle and a deceleration request corresponding to a request of decelerating the vehicle on the basis of at least an amount of driver's accelerator operation, and the control unit sets the sign of the predetermined differential rotation to be positive until the transition to the contact state in the synchronization engagement control process when it is determined that there is the acceleration request in the acceleration/deceleration request determination process and sets the sign of the predetermined differential rotation to be negative until the transition to the contact state in the synchronization engagement control process when it is determined that there is the deceleration request in the acceleration/deceleration request determination process.

Further, in the power transmission control device according to the invention, the control unit repeats the inverting of the sign of the predetermined differential rotation whenever a predetermined time elapses until the transition to the power transmission state after the transition to the contact state and allows the differential rotation to match the predetermined differential rotation whenever the sign of the predetermined differential rotation is inverted in the synchronization engagement control process.

Further, in the power transmission control device according to the invention, the control unit controls an absolute value of a differential rotation change rate corresponding to a change amount per unit time of the differential rotation to be a predetermined value at the time of inverting the sign of the predetermined differential rotation until the transition to the power transmission state after the transition to the contact state and allowing the differential rotation to match the predetermined differential rotation in the synchronization engagement control process.

Further, in the power transmission control device according to the invention, in a case in which the actuator is operated to switch the power transmission releasing state to the power transmission state, the control unit allows the differential rotation to match the predetermined differential rotation set to zero before the transition to the contact state, and changes the predetermined differential rotation to a value other than zero before the transition to the power transmission state after the transition to the contact state and allows the differential rotation to match the changed predetermined differential rotation in the synchronization engagement control process.

Further, in the power transmission control device according to the invention, the control unit is able to perform an acceleration/deceleration request determination process of determining an acceleration request corresponding to a request of accelerating a vehicle and a deceleration request corresponding to a request of decelerating the vehicle on the basis of at least an amount of driver's accelerator operation, and the control unit changes the predetermined differential rotation to a positive value until the transition to the contact state in the synchronization engagement control process when it is determined that there is the acceleration request in the acceleration/deceleration request determination process and changes the predetermined differential rotation to a negative value until the transition to the contact state in the synchronization engagement control process when it is determined that there is the deceleration request in the acceleration/deceleration request determination process.

Further, in the power transmission control device according to the invention, the control unit repeats the inverting of the sign of the predetermined differential rotation whenever a predetermined time elapses after the predetermined differential rotation is changed to a value other than zero until the transition to the power transmission state after the transition to the contact state and allows the differential rotation to match the predetermined differential rotation at the time of inverting the sign of the predetermined differential rotation in the synchronization engagement control process.

Further, in the power transmission control device according to the invention, the control unit controls an absolute value of a differential rotation change rate corresponding to a change amount per unit time of the differential rotation to be a predetermined value at the time of allowing the differential rotation to match the predetermined differential rotation after inverting the sign of the predetermined differential rotation and changing the predetermined differential rotation to a value other than zero until the transition to the power transmission state after the transition to the contact state in the synchronization engagement control process.

Advantageous Effects of Invention

According to the invention, the control unit has a function of the power transmission rotation speed calculation process of calculating the power transmission rotation speed corresponding to the rotation speed of the first rotation shaft at the time of establishing the power transmission operation between the engagement member and the target engagement member on the basis of the rotation speed of the second rotation shaft detected by the second rotation speed detection unit at the time of establishing the power transmission operation between the engagement member and the target engagement member, the differential rotation calculation process of calculating the differential rotation corresponding to the rotation speed difference obtained by subtracting the power transmission rotation speed calculated in the power transmission rotation speed calculation process from the rotation speed of the first rotation shaft detected by the first rotation speed detection unit, and the synchronization engagement control process of controlling the rotation speed of the power source so that the differential rotation matches the predetermined differential rotation and operating the actuator so as to establish the power transmission operation between the engagement member and the target engagement member after the differential rotation matches the predetermined differential rotation. Then, in the synchronization engagement control process, the differential rotation is allowed to match the predetermined differential rotation before the transition to the contact state, the predetermined differential rotation is changed before the transition to the power transmission state after the transition to the contact state and the differential rotation is allowed to match the changed predetermined differential rotation. Accordingly, even when a current state cannot be switched to the power transmission state while the differential rotation matches the predetermined differential rotation at one time, it is possible to switch the current state to the power transmission state by changing the predetermined differential rotation and allowing the differential rotation to match the changed predetermined differential rotation.

Further, according to the invention, in the synchronization engagement control process of the control unit, the differential rotation is allowed to match the predetermined differential rotation before the transition to the contact state, and the sign of the predetermined differential rotation is inverted before the transition to the power transmission state after the transition to the contact state and the differential rotation is allowed to match the predetermined differential rotation of which the sign is inverted. Accordingly, since the differential rotation is controlled in a direction a load at which the engagement member is pressed back from a contact position decreases even when the target engagement member contact the engagement member in the contact state, it is possible to smoothly switch the current state to the power transmission state.

Further, according to the invention, when it is determined that there is the acceleration request in the acceleration/deceleration request determination process, the sign of the predetermined differential rotation is set to be positive until the transition to the contact state in the synchronization engagement control process. Meanwhile, when it is determined that there is the deceleration request in the acceleration/deceleration request determination process, the sign of the predetermined differential rotation is set to be negative until the transition to the contact state in the engagement control process. Accordingly, there is an effect capable of obtaining the behavior of the vehicle that matches the driving sense of the driver.

Further, according to the invention, in the synchronization engagement control process of the control unit, the inverting of the sign of the predetermined differential rotation is repeated whenever a predetermined time elapses until the transition to the power transmission state after the transition to the contact state. Accordingly, when the current state cannot be switched to the power transmission state even after a predetermined time elapses after the sign of the predetermined differential rotation is inverted, it is possible to reliably switch the current state to the power transmission state by further inverting the sign of the predetermined differential rotation to invert the magnitude relationship of the rotation speed.

Further, according to the invention, in the synchronization engagement control process of the control unit, the absolute value of the differential rotation change rate corresponding to a change amount per unit time of the differential rotation is controlled to a predetermined value when the sign of the predetermined differential rotation is inverted before the transition to the power transmission state after the transition to the contact state. Accordingly, it is possible to efficiently switch the current state to the power transmission state by controlling a differential rotation change speed to an appropriate speed.

Further, according to the invention, in the synchronization engagement control process of the control unit, the differential rotation is allowed to match the predetermined differential rotation set to zero before the transition to the contact state, and the predetermined differential rotation is changed to a value other than zero before the transition to the power transmission state after the transition to the contact state and the differential rotation is allowed to match the changed predetermined differential rotation. Accordingly, there is a case in which the current state is immediately switched to the power transmission state in a state in which the differential rotation is zero, that is, the target synchronization side rotation speed matches the synchronization side rotation speed. However, even when the current state cannot be switched to the power transmission state like that, the current state can be switched to the power transmission state at a stage in which the relative positional relationship is shifted little by little to an engageable positional relationship after the differential rotation is gradually generated toward the predetermined differential rotation changed to a value other than zero. As a result, it is possible to reliably complete a gear engagement operation.

DESCRIPTION OF EMBODIMENTS

First Embodiment

Figure 1:
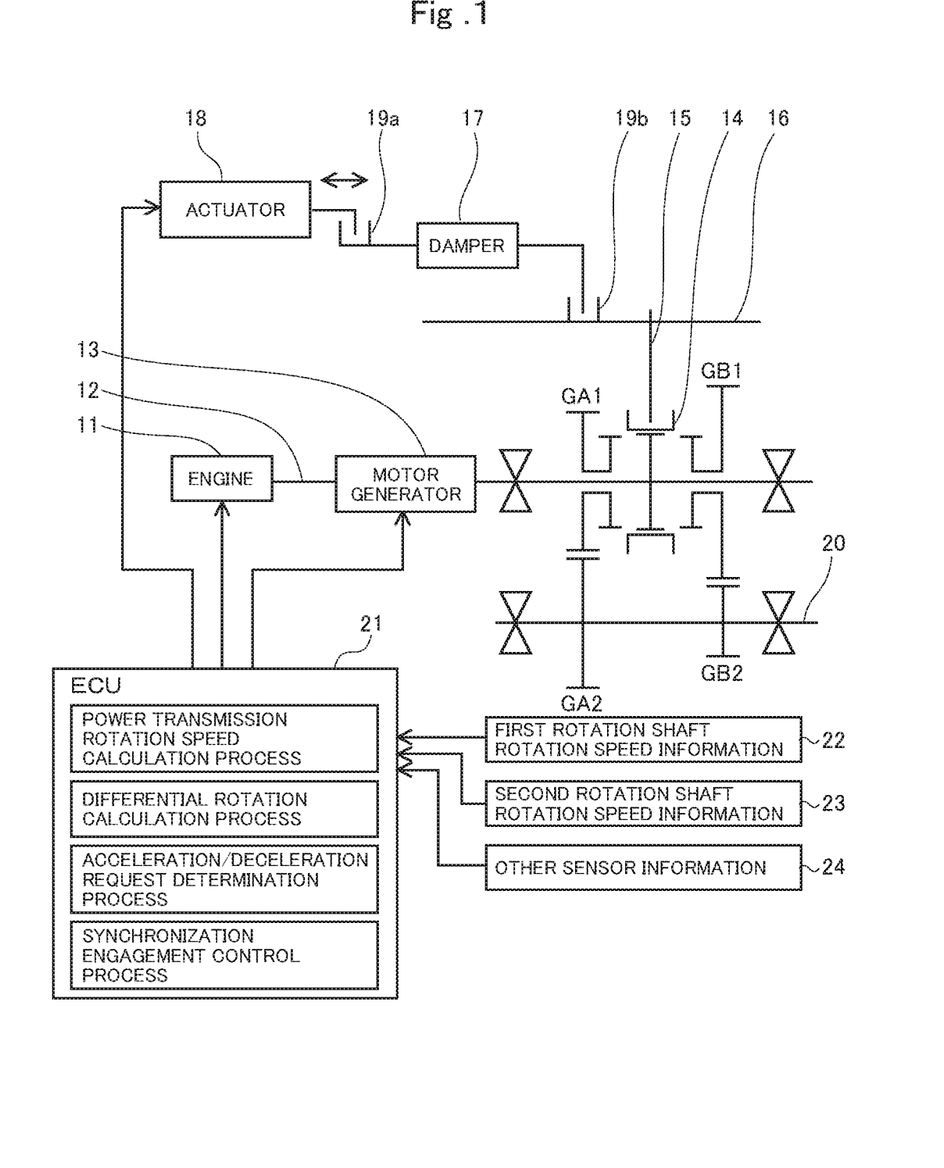
FIG. 1 is an explanatory diagram illustrating a configuration of a vehicle involving with a power transmission control device of the present invention.

Hereinafter, an example of a power transmission control device 10 according to a first embodiment will be described with reference to the drawings. FIG. 1 is an explanatory diagram illustrating a configuration of a vehicle involved with the power transmission control device 10 of the invention. In FIG. 1, 11 denotes an engine which is a power source, 12 denotes an input shaft which is a first rotation shaft, 13 denotes a motor generator which is another power source, 14 denotes a sleeve which is an engagement member, 15 denotes a fork, 16 denotes a shift shaft, 17 denotes a damper, 18 denotes an actuator, 19a and 19b denote power transmission mechanisms, 20 denotes an output shaft which is a second rotation shaft, and 21 denotes an engine control unit (hereinafter, ECU) which is a control unit, an idle gear GA1 and an idle gear GB1 which are target engagement members are connected to the input shaft 12 so as to be relatively rotatable, and gears GA2 and GB2 are connected to the output shaft 20 so as to rotate together. First rotation shaft rotation speed information 22 which is a rotation speed of an input shaft acquired by a first rotation speed detection unit such as a resolver attached to a motor generator, second rotation shaft rotation speed information 23 which is a rotation speed of an output shaft acquired by a second rotation speed detection unit such as a rotation speed sensor attached to the output shaft, and other sensor information 24 are input to the ECU 21.

Furthermore, in the following description, in order to simplify the description, a gear stage will be described such that only a pair of GA1 and GA2 and a pair of GB1 and GB2 are used, one sleeve is disposed between the idle gear GA1 and the idle gear GB1, and a gear is changed by the one sleeve. However, it is assumed that more gears are provided to be changed in fact. Of course, it is assumed that the idle gear and the sleeve are provided on the output shaft. Further, a configuration using three axes or more is also assumed, for example, as in the input shaft, the counter shaft, and the output shaft. Further, the power transmission mechanism 19a and 19b are interposed in order to transmit the power of the actuator 18 to the shift shaft 16, but this configuration is not limited. For example, any configuration can be used as long as the operation of the sleeve 14 can be controlled by the power of the actuator 18. Further, if the gears are changed by operating the sleeve using the actuator 18, the gears may be changed in response to a gear changing request based on a driver's operation or the gears maybe automatically changed when a predetermined gear changing condition is satisfied.

In FIG. 1, the engine 11 rotationally drives the input shaft 12. Furthermore, although it is not an essential configuration, the motor generator 13 capable of rotationally driving the input shaft 12 may be disposed. The idle gear GA1 and the idle gear GB1 are connected to be relatively rotatable on the input shaft 12 and in a neutral state, the sleeve 14 is located therebetween without engaging with any one of them. The position of the sleeve 14 at this time is a neutral position. When a gear is shifted to any one of the gear stages, for example, a gear is shifted to the gear stage of the idle gear GA1, the actuator 18 is operated so that the sleeve 14 slides to the idle gear GA1 so as to engage therewith and the idle gear GA1 and the input shaft 12 are fixed so as not to be relatively rotatable on the basis of the control to be described later. At this time, the power generated from the actuator 18 is transmitted to the shift shaft 16 through the power transmission mechanism 19a, the damper 17, and the power transmission mechanism 19b. The control of the actuator 18 is performed by the ECU 21. In the ECU 21, the operation amount is controlled by controlling a voltage value, a current value, or the like for the actuator 18, so that the stroke amount (the movement amount) of the sleeve 14 is controlled with high accuracy.

Further, the output of the engine 11 or the motor generator 13 is controlled in the ECU 21. Specifically, when gears are changed in a non-synchronous transmission, there is a need to synchronize the rotation speed of the idle gear with the rotation speed of the rotation shaft (in this example, the input shaft 12) in order to engage the sleeve 14 with the idle gear of the next gear stage. In order to eliminate the rotation speed difference, the rotation synchronization is performed by controlling the output of the engine 11 or the motor generator 13 using the ECU 21. The first rotation shaft rotation speed information 22 and the second rotation shaft rotation speed information 23 are input to the ECU 21 in order to perform the rotation speed synchronization control. The invention relates to rotation speed control necessary for changing gears in a non-synchronous transmission.

That is, the ECU 21 may have a function of, as illustrated in FIG. 1, performing a power transmission rotation speed calculation process of calculating a power transmission rotation speed corresponding to the rotation speed of the first rotation shaft at the time of establishing the power transmission operation between the engagement member and the target engagement member on the basis of the rotation speed of the second rotation shaft detected by the second rotation speed detection unit at the time of establishing the power transmission operation between the engagement member and the target engagement member, a differential rotation calculation process of calculating a differential rotation corresponding to a rotation speed difference obtained by subtracting the power transmission rotation speed calculated in the power transmission rotation speed calculation process from the rotation speed of the first rotation shaft detected by the first rotation speed detection unit, a synchronization engagement control process of controlling a rotation speed of a power source so that the differential rotation calculated in the differential rotation calculation process matches a predetermined differential rotation and operating an actuator so as to establish a power transmission operation between the engagement member and the target engagement member after the differential rotation matches the predetermined differential rotation, and an acceleration/deceleration request determination process of determining an acceleration request corresponding to a request for accelerating the vehicle and a deceleration request corresponding to a request for decelerating the vehicle on the basis of at least an amount of driver's accelerator operation amount.

Terms used in the following description will be defined as below.

Power Transmission Releasing State

This state means a state in which the engagement member and the target engagement member do not contact each other and do not transmit power. This state can be also mentioned as an engagement releasing state. That is, in this example, this is a state in which the spline of the sleeve does not contact the spline of the idle gear. Here, a case in which the idle gear exists at both sides is set to a neutral state.

Contact State

This state means a state in which the engagement member and the target engagement member contact each other, but do not transmit power. This state can be also mentioned as an engagement start state. Specifically, this state means a state in which a reaction force is generated so that the sleeve is separated from the gear piece at the time of transmitting power while chamfered portions or round portions contact each other when the spline tips of the sleeve and the idle gear have a chamfered shape or a round shape. Further, there is also a case in which tips contact each other when the spline tip is plane.

Power Transmission State

This state means a state in which the engagement member and the target engagement member contact each other and transmit power. This state can be also mentioned as an engagement completion state. In this example, this state means a state in which the spline of the sleeve is pressed into a spline gap of the idle gear so that power is transmitted in a complete engagement state. This case does not include only a case in which the chamfered portions, the round portions, and the spline tips contact each other.

Pressing Completion State

This state means a state in which the engagement member is moved to switch the contact state to the power transmission state and the engagement member is further moved so that the engagement member reaches a boundary of the movement range. This state is apart of the power transmission state. Specifically, this state means a state in which the actuator is continuously operated so as to further move the engagement member from the power transmission state and is controlled to abut on a stopper corresponding to the boundary of the movement range of the actuator. For example, this state means a state in which the actuator is operated to press the stopper at a constant load. This state means an image in which the sleeve further moves inward from the power transmission state.

Engagement Operation

This operation means an operation of moving the engagement member so that the power transmission releasing state becomes the power transmission state through the contact state. Specifically, this operation corresponds to an operation of moving the sleeve toward the idle gear by controlling the actuator moving the sleeve.

Figure 2:
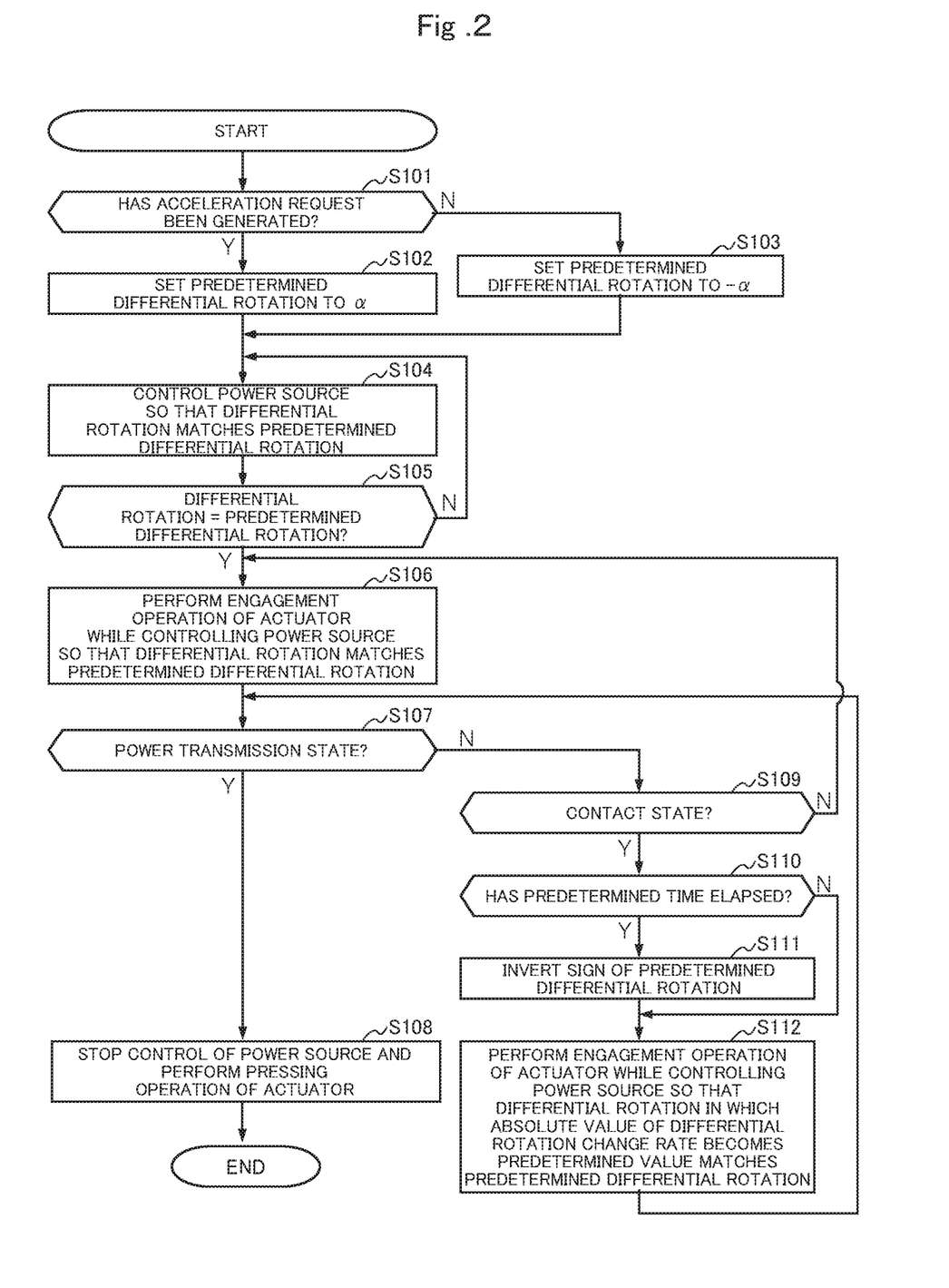
FIG. 2 is a flowchart illustrating a flow of engagement operation control of a power transmission control device according to a first embodiment of the invention.

FIG. 2 is a flowchart illustrating a flow of the engagement operation control of the power transmission control device 10 according to the first embodiment of the invention. The engagement operation control by the power transmission control device 10 according to the invention is started at a stage in which a gear changing request is input and a power transmission releasing process of a gear stage at that time point is started.

For example, this control means control in a situation in which a gear changing request is input while the sleeve 14 engages with the idle gear GA1, the sleeve 14 is moved from the idle gear GA1 to complete a power transmission releasing process, and then the sleeve 14 engages with the idle gear GB1 in FIG. 1. The flowchart illustrated in FIG. 2 means the synchronization engagement control process in the ECU 21.

As a premise, the ECU 21 needs to acquire a synchronization side rotation speed N1 and a target synchronization side rotation speed N2 when performing the synchronization engagement control process and hence calculates a differential rotation corresponding to a rotation speed difference between N1 and N2 by the differential rotation calculation process on the basis of N1 and N2. In the following flowchart, the contact state is selected after controlling the synchronization side rotation speed N1 so that the differential rotation becomes a predetermined differential rotation $\alpha$ (or $-\alpha$). The value of the predetermined differential rotation $\alpha$ is set in advance to a value in which the possibility of successful engagement is high from the structure of the gear or the like.

In FIG. 2, the ECU 21 first determines whether an acceleration request for a vehicle is generated on the basis of information such as an amount of driver's accelerator operation by the acceleration/deceleration request determination process (Step of S101). When the acceleration request is generated (S101-Y), the predetermined differential rotation is set to $\alpha$ (Step of S102). When the deceleration request is generated (S101-N), the predetermined differential rotation is set to $-\alpha$ (Step of S103). After the predetermined differential rotation is set, a power source is controlled so that the differential rotation matches the predetermined differential rotation (Step of S104). Then, it is determined whether the differential rotation matches the predetermined differential rotation (Step of S105). When the differential rotation does not match the predetermined differential rotation (S105-N), the routine returns to Step of S104 and the power source is controlled so as to match the predetermined differential rotation. Then, when the differential rotation matches the predetermined differential rotation (S105-Y), the routine proceeds to Step of S106.

Next, the actuator is controlled so as to perform the engagement operation (Step of S106). It is determined whether the power transmission state is established as a result of performing the engagement operation (Step of S107). When the power transmission state is established (S107-Y), since the engagement operation is completed, the control of the power source (the control of the power source for allowing the differential rotation to match the predetermined differential rotation) is stopped, the pressing operation of the actuator is controlled so as to become the pressing completion state (Step of S108), and then the process is ended. Since the pressing completion state is set, it is possible to prevent a gas leakage which is a phenomenon in which the sleeve unintentionally moves from the power transmission state to the power transmission releasing state through the contact state due to the backlash and deflection of the power transmission path of the actuator.

When the power transmission state is not established (S107-N), it is determined whether the current state is the contact state (Step of S109). When the current state is not the contact state (S109-N), the routine returns to Step of S106 so as to perform an engagement operation again and to determine whether the power transmission state is established (S106 and S107). When it is determined that the current state is the contact state in Step of S109 (S109-Y), an elapsed time from the determination of the contact state is counted and a determination on whether the elapsed time reaches a predetermined time is performed (Step of S110). When the elapsed time does not reach the predetermined time (S110-N), the routine proceeds to Step of S112 so as to perform an engagement operation by controlling an actuator (Step of S112) and returns to Step of S107 again. Regarding the counting start point of the elapsed time for the predetermined time, the switching timing to the contact state or the establishment timing of the precedent predetermined elapsed time is set as a next counting start point. Further, a determination on whether the current state is switched to the contact state may be performed on the basis of the sleeve movement amount by the actuator, that is, the control amount of the actuator.

When it is determined that the predetermined time elapses after the determination of the contact state in Step of S110 (S110-Y), the sign of the predetermined differential rotation is inverted (Step of S111). Inverting the sign means setting the predetermined differential rotation to $-\alpha$ when the current predetermined differential rotation is $\alpha$ and setting the predetermined differential rotation to $\alpha$ when the current predetermined differential rotation is $-\alpha$. When the sign of the predetermined differential rotation is inverted, a rotation speed difference is generated between a current differential rotation and a changed predetermined differential rotation. For this reason, the engagement operation is performed by controlling the actuator while controlling the power source so that the differential rotation matches the changed predetermined differential rotation (Step of S112). In the control of allowing the differential rotation to match the changed predetermined differential rotation at this time, the power source is controlled so that an absolute value of a differential rotation change rate becomes a predetermined value. Accordingly, since it is possible to appropriately set the differential rotation change rate for the sleeve movement speed, it is possible to more smoothly perform the switching to the power transmission state. Further, in the process of the control of allowing the differential rotation to match the changed predetermined differential rotation, the sign of the differential rotation is inverted while passing through a point in which the differential rotation is zero. After the engagement operation is performed in Step of S112, the routine returns to Step of S107 again to determine whether the power transmission state is established (Step of S107). When the power transmission state is established (S107-Y) as a result of performing the engagement operation by inverting the sign of the predetermined differential rotation, since the engagement operation is completed, the control of the power source is stopped, the actuator is pressed to become the pressing completion state (Step of S108), and then the process is ended. When the power transmission state is not established (S107-N) even after performing the engagement operation by inverting the sign of the predetermined differential rotation, the engagement operation is performed while inverting the sign of the predetermined differential rotation whenever a predetermined time elapses until the power transmission state is established (Repeating of S107 to S112).

When the current state is switched to the contact state from the state of the predetermined differential rotation $\alpha$, there is a case in which the spline tip of the idle gear contacts the spline tip of the sleeve 14. In the case of the contact between chamfered portions or round portions, a load in which the sleeve is pressed back from the contact point continuously work if the differential rotation does not change and remains at $\alpha$. In the related art, in order to switch this state to the power transmission state, the pressing force of the sleeve 14 is set large and is forcedly pressed. However, at this time, when the rotation speed of N1 is controlled to a point in which the predetermined differential rotation $\alpha$ changes to the predetermined differential rotation $-\alpha$, the differential rotation decreases to zero and the sleeve 14 is pressed in while the sign is inverted. That is, since it is controlled so that the sign of the predetermined differential rotation is inverted to perform the engagement operation, a relative positional relationship between the spline tip of the idle gear and the spline tip of the sleeve 14 is displaced in a direction in which a load at which the sleeve is pressed back from a contact position decreases. Thus, even when the pressing thrust of the sleeve 14 is not increased, the sleeve can be pressed smoothly and be switched to the power transmission state.

Figure 3A:
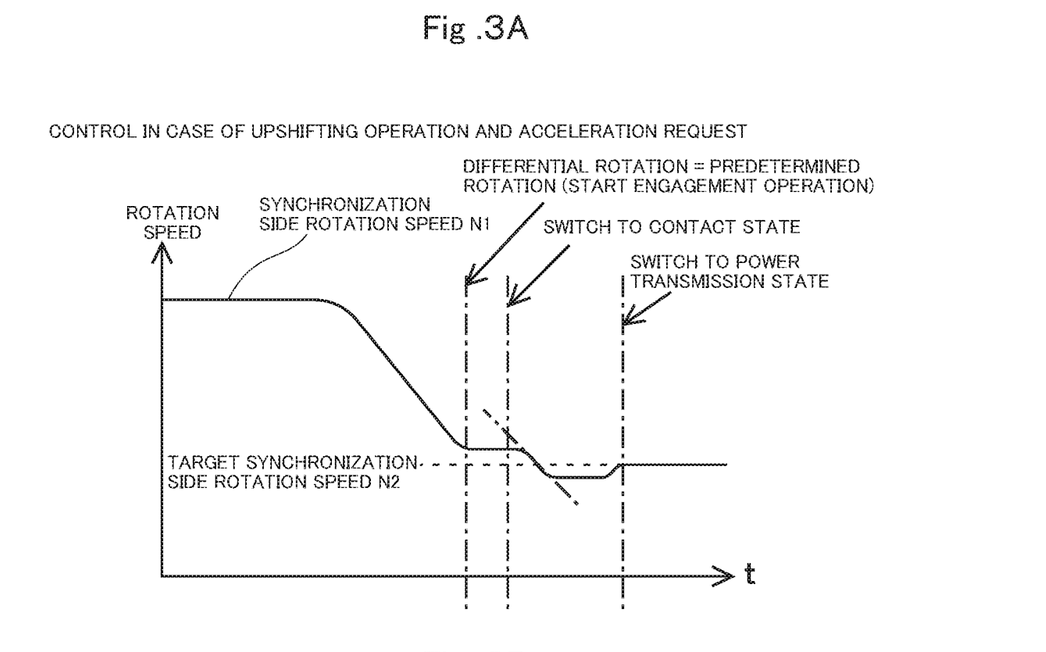
FIGS. 3A and 3B are explanatory diagrams illustrating rotation speed control of the first embodiment.
Figure 3B:
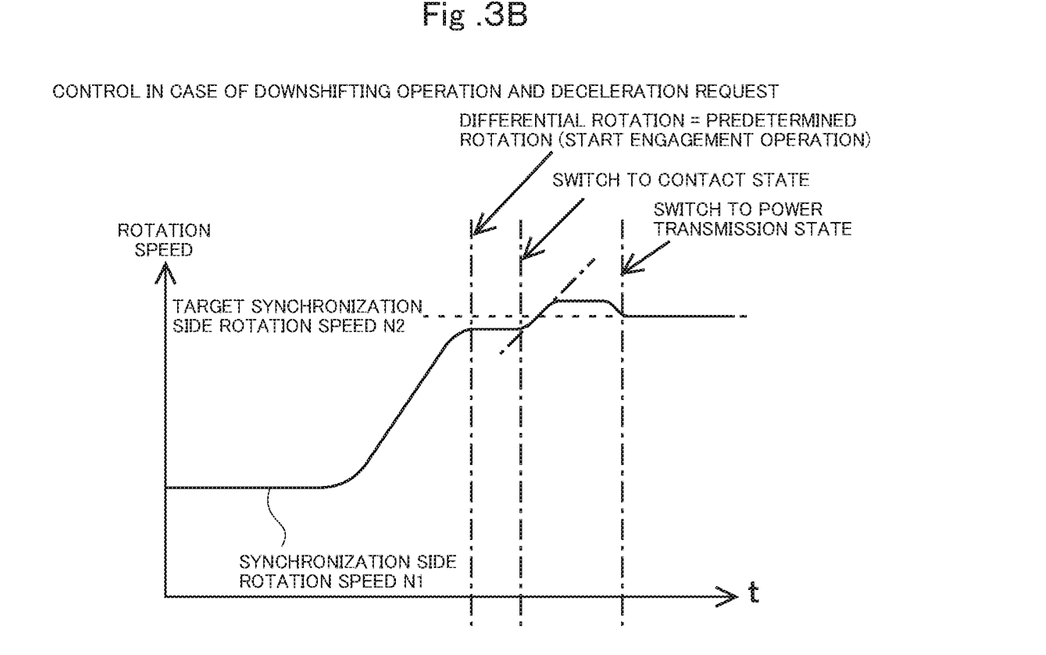

FIGS. 3A and 3B are an explanatory diagram for illustrating the rotation speed control of the first embodiment, where FIG. 3(*a*) illustrates control when an upshifting operation is performed and an acceleration request is generated and FIG. 3(*b*) illustrates control when a downshifting operation is performed and a deceleration request is generated. As illustrated in FIG. 3(*a*), when the upshifting operation is performed and the acceleration request is generated, the rotation speed N1 of the sleeve is decreased by the driving force of the engine or the motor generator due to a gear ratio so that the rotation speed N1 of the sleeve is decreased to N2+$\alpha$ at which the rotation speed is higher than the rotation speed N2 of the idle gear by a predetermined rotation speed $\alpha$. At a stage of N1=N2+$\alpha$, that is, a stage in which the differential rotation matches the predetermined differential rotation $\alpha$, the sleeve is moved to the idle gear of the gear changing target so that the current state is switched to the contact state and is further switched to the power transmission state. When the power transmission state is not established even when a predetermined time elapses after the current state becomes the contact state, the sign of the predetermined differential rotation is inverted so that the predetermined differential rotation becomes $-\alpha$. In this process, the rotation speed N1 passes through a point in which the differential rotation between N1 and N2 becomes zero and moves toward a point in which the sign of the differential rotation is inverted so that the predetermined differential rotation becomes $-\alpha$. With such control, even when the pressing force of the sleeve 14 is small, the sleeve can be pressed against the facing sleeve and be switched to the power transmission state. Since the idle gear, the sleeve, and the rotation shaft rotate together after the current state is switched to the power transmission state, they settle at the same rotation speed. FIG. 3(*a*) illustrates a state in which the power transmission state is not established at a stage of the predetermined differential rotation $\alpha$, the sign of the predetermined differential rotation is inverted, the power source is controlled so that the differential rotation matches the predetermined differential rotation $-\alpha$, and the current state is switched to the power transmission state by the engagement operation. When the current state cannot be switched to the power transmission state even after the process of FIG. 3(*a*), a process of performing the engagement operation by inverting the sign of the predetermined differential rotation whenever a predetermined time elapses is performed until the current state can be switched to the power transmission state.

Further, as illustrated in FIG. 3(*b*), when the downshifting operation is performed and the deceleration request is generated, the rotation speed N1 of the sleeve is increased by the driving force of the engine or the motor generator due to a gear ratio so that the rotation speed N1 of the sleeve is increased to N2-$\alpha$ at which the rotation speed is lower than the rotation speed N2 of the idle gear by $\alpha$. At a stage of N1=N2-$\alpha$, that is, a stage in which the differential rotation matches the predetermined differential rotation $-\alpha$, the sleeve is moved to the idle gear of the gear changing target so that the current state is switched to the contact state. Then, it is controlled so that the current state becomes the contact state and further becomes the power transmission state. When the power transmission state is not established even when a predetermined time elapses after the current state is switched to the contact state, the sign of the predetermined differential rotation is inverted so that the predetermined differential rotation becomes $-\alpha$. In this process, the rotation speed N1 passes through a point in which the differential rotation between N1 and N2 becomes zero and moves toward a point in which the sign of the differential rotation is inverted so that the predetermined differential rotation becomes $\alpha$. With such control, even when the pressing force of the sleeve 14 is small, the sleeve can be pressed against the facing sleeve and be switched to the power transmission state. Since the idle gear, the sleeve, and the rotation shaft rotate together after the current state is switched to the power transmission state, they settle at the same rotation speed. FIG. 3(a) illustrates a state in which the power transmission state is not established at a stage of the predetermined differential rotation −α, the sign of the predetermined differential rotation is inverted, the power source is controlled so that the differential rotation matches the predetermined differential rotation α, and the current state is switched to the power transmission state by the engagement operation. When the current state cannot be switched to the power transmission state even after the process of FIG. 3(b), a process of performing the engagement operation by inverting the sign of the predetermined differential rotation whenever a predetermined time elapses is performed until the current state can be switched to the power transmission state.

As described above, according to the power transmission control device 10 of the first embodiment of the invention, the current state is switched to the contact state after a synchronization side rotation speed is allowed to match a rotation speed deviating from a target synchronization side rotation speed by a predetermined differential rotation α (or −α) by changing the synchronization side rotation speed using the power source after completing a power transmission releasing process of releasing the engagement member engaging with the target engagement member of the precedent gear stage, the sign of the predetermined differential rotation is inverted after switching the current state to the contact state, and the current state is switched to the power transmission state while controlling the synchronization side rotation speed so that the differential rotation matches the predetermined differential rotation again, a load at which the engagement member is pressed back from a contact position is controlled to decrease even when the target engagement member and the engagement member contact each other in the contact state. Accordingly, it is possible to smoothly switch to the power transmission state.

Second Embodiment

Next, an example of the power transmission control device 10 according to a second embodiment will be described with reference to the drawings. Since the configuration of the power transmission control device 10 according to the second embodiment is the same as that of FIG. 1, a description thereof will be omitted. Differently from the first embodiment, the second embodiment is characterized in that the current state starts to be switched to the contact state after allowing the synchronization side rotation speed N1 to match the target synchronization side rotation speed N2 and the synchronization side rotation speed N1 is controlled to cause a differential rotation after the current state is switched to the contact state.

Figure 4:
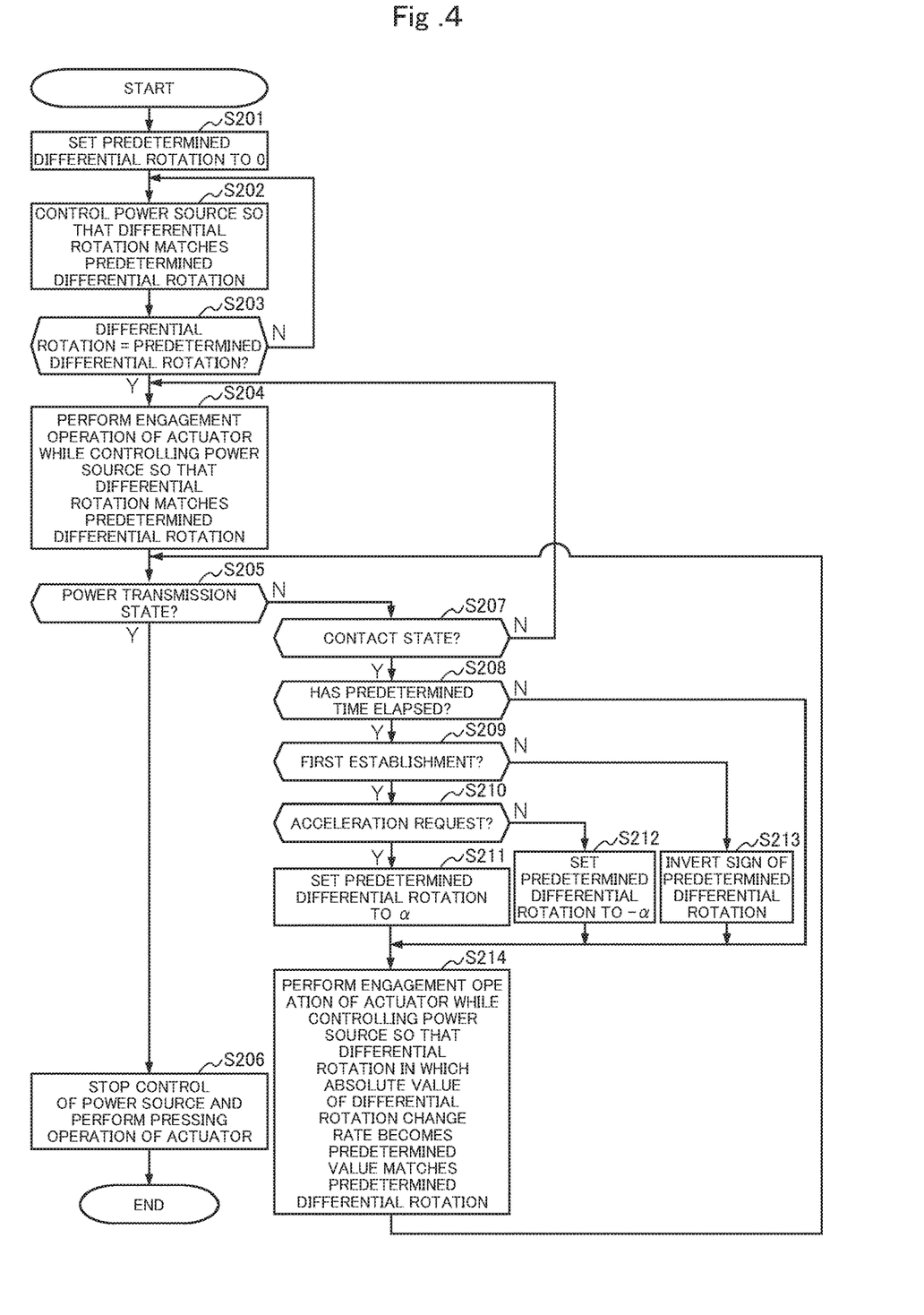
FIG. 4 is a flowchart illustrating a flow of engagement operation control of a power transmission control device according to a second embodiment of the invention.

FIG. 4 is a flowchart illustrating a flow of an engagement operation of the power transmission control device 10 according to the second embodiment of the invention. The engagement operation control using the power transmission control device 10 according to the invention is started at a stage in which a gear changing request is input and the power transmission releasing process of the gear stage is completed at that time point. Furthermore, since the definitions of terms and the like are the same as those of the first embodiment, a description thereof will be omitted.

In FIG. 4, the ECU 21 first sets a predetermined differential rotation to zero (Step of S201). After the predetermined differential rotation is set to zero, a power source is controlled so that a differential rotation matches the predetermined differential rotation (Step of S202). Then, it is determined whether the differential rotation matches the predetermined differential rotation (Step of S203). When the differential rotation does not match the predetermined differential rotation (S203-N), the routine returns to Step of S202 to control the power source so that the differential rotation matches the predetermined differential rotation. Meanwhile, when the differential rotation matches the predetermined differential rotation (S203-Y), the routine proceeds to Step of S204.

Next, the actuator is controlled so as to perform the engagement operation (Step of S204). It is determined whether the power transmission state is established as a result of performing the engagement operation (Step of S205). When the power transmission state is established (S205-Y), since the engagement operation is completed, the control of the power source (the control of the power source for allowing the differential rotation to match the predetermined differential rotation) is stopped, the pressing operation of the actuator is controlled to become the pressing completion state (Step of S206), and the process is ended. Since the pressing completion state is set, it is possible to prevent a gas leakage which is a phenomenon in which the sleeve unintentionally moves from the power transmission state to the power transmission releasing state through the contact state due to the backlash and deflection of the power transmission path of the actuator.

When the power transmission state is not established (S205-N), it is determined whether the current state is the contact state (Step of S207). When the current state is not the contact state (S207-N), the routine returns to Step of S204 so as to perform an engagement operation again and to determine whether the power transmission state is established (S204 and S205). When it is determined that the current state is the contact state in Step of S207 (S207-Y), an elapsed time from the determination of the contact state is counted and a determination on whether the elapsed time reaches a predetermined time is performed (Step of S208). When the elapsed time does not reach the predetermined time (S208-N), the routine proceeds to Step of S214 so as to perform an engagement operation by controlling an actuator (Step of S214) and returns to Step of S205 again.

When it is determined that the predetermined time elapses after the determination of the contact state in Step of S207 (S208-Y), it is determined whether it is the first time that the predetermined time elapses (Step of S209). When it is the first time that the predetermined time elapses (S209-Y), it is determined whether the acceleration request for the vehicle is generated on the basis of information such as an amount of driver's accelerator operation by the acceleration/deceleration request determination process (Step of S210). When the acceleration request is generated (S210-Y), the predetermined differential rotation is set to α (Step of S211). When the deceleration request is generated (S210-N), the predetermined differential rotation is set to −α (Step of S212). Further, when it is not the first time that the predetermined time elapses (S209-N), the predetermined differential rotation needs to be set previously and the sign of the predetermined differential rotation is inverted (Step of S213). After the predetermined differential rotation is set or the sign of the predetermined differential rotation is inverted, the power source is controlled so that the differential rotation matches the predetermined differential rotation (Step of S104). Since a rotation speed difference is generated between a current differential rotation and a changed predetermined differential rotation, the engagement operation is performed by controlling the actuator while controlling the power source so that the differential rotation matches the changed predetermined differential rotation (Step of S112). In the control of allowing the differential rotation to match the changed predetermined differential rotation at this time, the power source is controlled so that an absolute value of a differential rotation change rate becomes a predetermined value (Step of S214).

After performing the engagement operation in Step of S214, the routine returns to Step of S205 so as to determine whether the power transmission state is established (Step of S205). When the power transmission state is established as a result of performing the engagement operation (S205-Y), since the engagement operation is completed, the control of the power source is stopped, the pressing operation of the actuator is performed so as to become the pressing completion state (Step of S206), and then the process is ended. When the power transmission state is not established even when the engagement operation is performed (S107-N), the engagement operation is performed while inverting the sign of the predetermined differential rotation whenever a predetermined time elapses until the power transmission state is established (Repeating of S205 to S214).

In the second embodiment, the engagement operation is performed after N1 is equal to N2, that is, the differential rotation is set to zero, the predetermined differential rotation is set to α or −α at a stage in which a predetermined time elapses after the current state is switched to the contact state, and the current state is switched to the power transmission state while gradually generating a differential rotation. That is, the power source is controlled so as to generate the predetermined differential rotation from a state in which the differential rotation is zero while the current state is switched to the contact state. There is a case in which the current state is immediately switched to the power transmission state while the differential rotation is zero. Even when the tips of the teeth come into contact with each other at the time of the first engagement as illustrated in FIG. 6, the differential rotation is gradually generated toward the predetermined differential rotation α (or −α). For this reason, the relative tooth positions are shifted little by little and are shifted to an engageable positional relationship. As a result, it is possible to reliably switch the current state to the power transmission state.

Figure 5A:
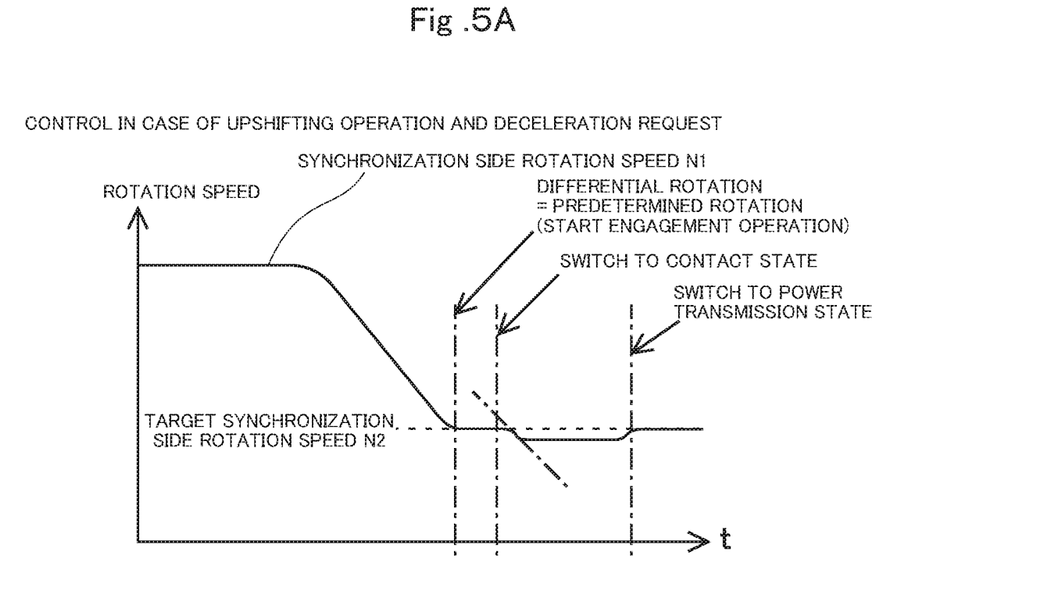
FIGS. 5A and 5B are explanatory diagrams illustrating rotation speed control of the second embodiment.
Figure 5B:
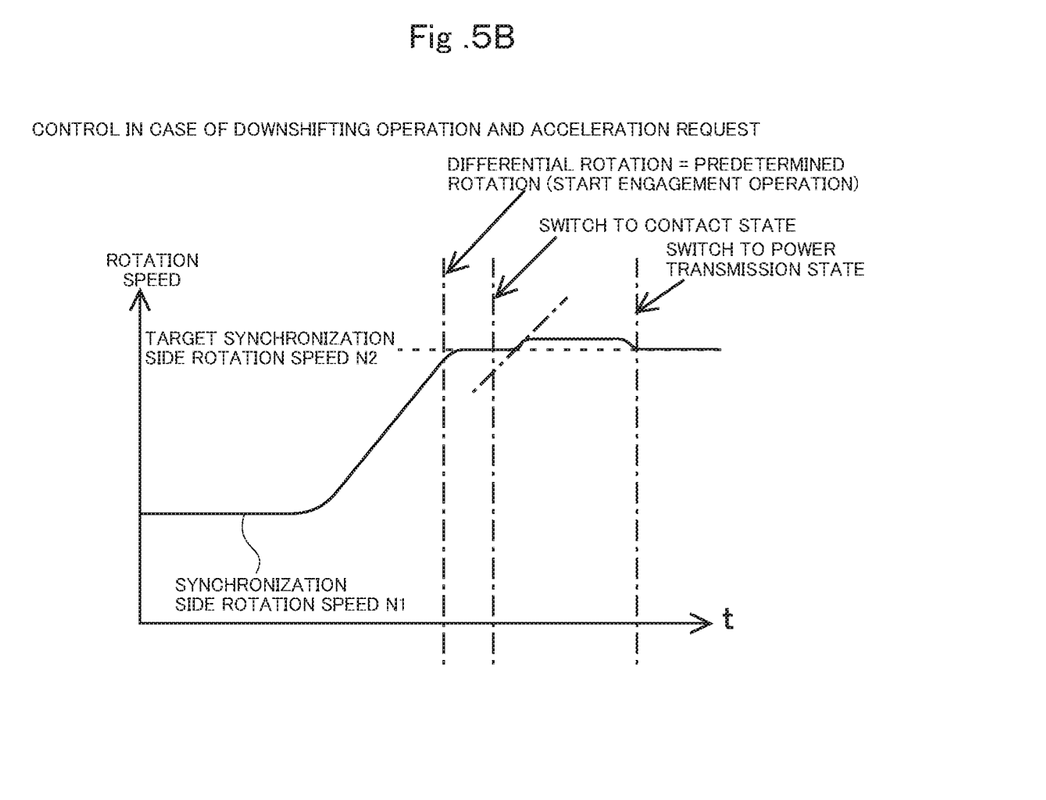

FIGS. 5A and 5B are an explanatory diagram for illustrating rotation speed control of the second embodiment, where FIG. 5(a) illustrates control when an upshifting operation is performed and a deceleration request is generated and FIG. 5(b) illustrates control when a downshifting operation is performed and an acceleration request is generated. As illustrated in FIG. 5(a), when the upshifting operation is performed and the deceleration request is generated, the rotation speed N1 of the sleeve is decreased by the driving force of the engine or the motor generator due to a gear ratio until the rotation speed N1 of the sleeve matches the rotation speed N2 of the idle gear. At a stage of N1=N2, that is, a stage in which the differential rotation is equal to zero, the sleeve is moved to the idle gear of the gear changing target so that the current state is switched to the contact state and is further switched to the power transmission state. When the power transmission state is not established even when a predetermined time elapses after the current state becomes the contact state, it is considered that there is the deceleration request. Accordingly, the predetermined differential rotation is set to −α so as to decrease the rotation speed N1 of the sleeve. At the same time, it is attempted to switch to the power transmission state by moving the sleeve while allowing the differential rotation to match the predetermined differential rotation −α. Since the differential rotation is gradually generated toward the predetermined differential rotation −α, the power transmission state is established at a stage in which the relative tooth positions are shifted little by little and are shifted to an engageable positional relationship. Since the idle gear, the sleeve, and the rotation shaft rotate together after the current state is switched to the power transmission state, they settle at the same rotation speed. FIG. 5(a) illustrates a state in which the power transmission state is not established at a stage of the differential rotation of 0, the predetermined differential rotation −α is set, the engagement operation is performed while allowing the differential rotation to be the predetermined differential rotation −α by controlling the power source, and the power transmission state is established after the differential rotation becomes the predetermined differential rotation −α. When the current state cannot be switched to the power transmission state even after the process of FIG. 5(a), a process of performing the engagement operation by inverting the sign of the predetermined differential rotation whenever a predetermined time elapses is performed until the current state can be switched to the power transmission state.

Further, as illustrated in FIG. 5(b), when the downshifting operation is performed and the acceleration request is generated, the rotation speed N1 of the sleeve is increased by the driving force of the engine or the motor generator due to a gear ratio until the rotation speed N1 of the sleeve matches the rotation speed N2 of the idle gear. At a stage of N1=N2, that is, a stage in which the differential rotation is zero, the sleeve is moved to the idle gear of the gear changing target so that the current state is switched to the contact state and is further switched to the power transmission state. When the power transmission state is not established even when a predetermined time elapses after the current state is switched to the contact state, it is considered that there is the acceleration request. Accordingly, the predetermined differential rotation is set to α so as to increase the rotation speed N1 of the sleeve. At the same time, it is attempted to switch to the power transmission state by moving the sleeve while allowing the differential rotation to match the predetermined differential rotation α. Since the differential rotation is gradually generated toward the predetermined differential rotation α, the power transmission state is established at a stage in which the relative tooth positions are shifted little by little and are shifted to an engageable positional relationship. Since the idle gear, the sleeve, and the rotation shaft rotate together after the current state is switched to the power transmission state, they settle at the same rotation speed. FIG. 5(b) illustrates a state in which the power transmission state is not established at a stage of the differential rotation of 0, the predetermined differential rotation α is set, the engagement operation is performed while allowing the differential rotation to be the predetermined differential rotation α by controlling the power source, and the power transmission state is established after the differential rotation becomes the predetermined differential rotation α. When the current state cannot be switched to the power transmission state even after the process of FIG. 5(b), a process of performing the engagement operation by inverting the sign of the predetermined differential rotation whenever a predetermined time elapses is performed until the current state can be switched to the power transmission state.

As described above, according to the power transmission control device 10 of the second embodiment of the invention, a target synchronization side rotation speed is allowed to match a synchronization side rotation speed by changing the synchronization side rotation speed using the power source after completing a power transmission releasing process of releasing the engagement member engaging with the target engagement member of the precedent gear stage, the current state is switched to the contact state by moving the engagement member to the target engagement member when the target synchronization side rotation speed matches the synchronization side rotation speed, and the power source is controlled to generate a predetermined differential rotation $\alpha$ (or $-\alpha$) from a state in which the target synchronization side rotation speed matches the synchronization side rotation speed when a predetermined time elapses from the contact state. Accordingly, there is a case in which the current state is immediately switched to the power transmission state while the target synchronization side rotation speed matches the synchronization side rotation speed. However, even when the current state cannot be switched to the power transmission state like that, the current state can be switched to the power transmission state at a stage in which the relative positional relationship is shifted little by little to an engageable positional relationship after the differential rotation is gradually generated toward the predetermined differential rotation. As a result, it is possible to reliably complete a gear engagement operation.

Furthermore, in the first or second embodiment, the differential rotation is calculated as below. At the time of establishing the power transmission operation between the engagement member and the target engagement member, a power transmission rotation speed corresponding to the rotation speed of the first rotation shaft when establishing the power transmission operation between the engagement member and the target engagement member is calculated on the basis of the rotation speed of the second rotation shaft detected by the second rotation speed detection unit and a rotation speed difference obtained by subtracting the power transmission rotation speed from the rotation speed of the first rotation shaft detected by the first rotation speed detection unit is calculated as a differential rotation. That is, the rotation speed of the first rotation shaft when assuming that the power transmission operation is established at the time point of the current rotation speed of the second rotation shaft is defined as the power transmission rotation speed and a value obtained by subtracting the power transmission rotation speed from the current rotation speed of the first rotation shaft is defined as the differential rotation. This is substantially the same in that a difference between the rotation speed of the engagement member and the rotation speed of the target engagement member is calculated. However, the sign of the differential rotation can be set in one direction regardless of whether the engagement member and the target engagement member are provided in anyone of the first rotation shaft and the second rotation shaft due to the above-described definition.

When it is determined that the acceleration request is generated on the basis of the differential rotation defined in this way, the sign of the predetermined differential rotation is set to be positive until the current state is switched to the contact state. Meanwhile, when it is determined that the deceleration request is generated on the basis of the differential rotation, the sign of the predetermined differential rotation is set to negative until the current state is switched to the contact state. Accordingly, it is possible to realize control capable of obtaining the behavior of the vehicle that matches the driving sense of the driver.

In the first or second embodiment, the position of the sleeve 14 immediately before the current state is switched to the contact state is not mentioned. Since the sleeve 14 is located at a neutral position in the power transmission releasing state, a gear engagement operation may be started from this position or the current state may be switched to the contact state from a position immediately before the contact state at a stage in which an instruction of switching the current state to the contact state is generated after moving the sleeve 14 to a position immediately before the engagement operation with the idle gear of the shift changing target at the time of changing the rotation speed of the synchronization side rotation speed N1 of each embodiment so as to be located at a position immediately before the contact state. When the current state is switched to the contact state from a position immediately before the contact state, there is an effect that the time taken until the current state is switched to the power transmission state can be shortened.

Furthermore, in the first or second embodiment, as a configuration for the engagement between the idle gear and the sleeve, an example in which the chamfered surface is formed on the tooth tip has been described in FIG. 6. However, even in a dog tooth without a chamfered surface, a gear engagement operation can be reliably performed by applying the invention.

REFERENCE SIGNS LIST

10 Power transmission control device
11 Engine
12 Input shaft
13 Motor generator
14 Sleeve
15 Fork
16 Shift shaft
17 Damper
18 Actuator
19a, 19b Power transmission mechanism
20 Output shaft
21 Engine control unit (ECU)
22 First rotation shaft rotation speed information
23 Second rotation shaft rotation speed information
24 Other sensor information

The invention claimed is:

1. A power transmission control device for a vehicle comprising:
a first rotation shaft;
a power source which is provided to adjust a rotation speed of the first rotation shaft;
a second rotation shaft configured to rotate together with an axle;
a first rotation speed detection unit which detects the rotation speed of the first rotation shaft;
a second rotation speed detection unit which detects a rotation speed of the second rotation shaft;
an engagement member that rotates together with any one shaft of the first rotation shaft and the second rotation shaft and is provided to be movable with respect to the one shaft in an axial direction;
a target engagement member that is provided in the one shaft to be relatively rotatable and rotates together with the other shaft of the first rotation shaft and the second rotation shaft;
an actuator which is operated to move the engagement member in the axial direction; and
a control unit which is able to perform a power transmission rotation speed calculation process of calculating a power transmission rotation speed corresponding to the rotation speed of the first rotation shaft at a time of establishing a power transmission operation between the engagement member and the target engagement member on the basis of the rotation speed of the second rotation shaft detected by the second rotation speed detection unit at the time of establishing the power transmission operation between the engagement member and the target engagement member, a differential rotation calculation process of calculating a differential rotation corresponding to a rotation speed difference obtained by subtracting the power transmission rotation speed calculated in the power transmission rotation speed calculation process from the rotation speed of the first rotation shaft detected by the first rotation speed detection unit, and a synchronization engagement control process of controlling a rotation speed of the power source so that the differential rotation calculated in the differential rotation calculation process matches a predetermined differential rotation and operating the actuator so that the power transmission operation between the engagement member and the target engagement member is established after the differential rotation matches the predetermined differential rotation, wherein an engagement/disengagement state between the engagement member and the target engagement member includes:

at least a power transmission releasing state in which no contact occurs between the engagement member and the target engagement member;

a power transmission state in which a contact between the engagement member and the target engagement member occurs and the power transmission operation is established; and a contact state in which a contact between the engagement member and the target engagement member occurs, but the power transmission operation is not established, wherein in a case in which the actuator is operated so as to switch the power transmission releasing state to the power transmission state, the control unit allows the differential rotation to match the predetermined differential rotation set to a value other than zero before the transition to the contact state in the synchronization engagement control process, and inverts a sign of the predetermined differential rotation before the transition to the power transmission state after the transition to the contact state and allows the differential rotation to match the predetermined differential rotation of which the sign is inverted.

2. The power transmission control device according to claim 1, wherein the control unit is able to perform an acceleration/deceleration request determination process of determining an acceleration request corresponding to a request of accelerating a vehicle and a deceleration request corresponding to a request of decelerating the vehicle on the basis of at least an amount of driver's accelerator operation, and wherein the control unit sets the sign of the predetermined differential rotation to be positive until the transition to the contact state in the synchronization engagement control process when it is determined that there is the acceleration request in the acceleration/deceleration request determination process and sets the sign of the predetermined differential rotation to be negative until the transition to the contact state in the synchronization engagement control process when it is determined that there is the deceleration request in the acceleration/deceleration request determination process.

3. The power transmission control device according to claim 2, wherein the control unit repeats the inverting of the sign of the predetermined differential rotation whenever a predetermined time elapses until the transition to the power transmission state after the transition to the contact state and allows the differential rotation to match the predetermined differential rotation whenever the sign of the predetermined differential rotation is inverted in the synchronization engagement control process.

4. The power transmission control device according to claim 3, wherein the control unit controls an absolute value of a differential rotation change rate corresponding to a change amount per unit time of the differential rotation to be a predetermined value at a time of inverting the sign of the predetermined differential rotation until the transition to the power transmission state after the transition to the contact state and allowing the differential rotation to match the predetermined differential rotation in the synchronization engagement control process.

5. The power transmission control device according to claim 2, wherein the control unit controls an absolute value of a differential rotation change rate corresponding to a change amount per unit time of the differential rotation to be a predetermined value at a time of inverting the sign of the predetermined differential rotation until the transition to the power transmission state after the transition to the contact state and allowing the differential rotation to match the predetermined differential rotation in the synchronization engagement control process.

6. The power transmission control device according to claim 1, wherein the control unit repeats the inverting of the sign of the predetermined differential rotation whenever a predetermined time elapses until the transition to the power transmission state after the transition to the contact state and allows the differential rotation to match the predetermined differential rotation whenever the sign of the predetermined differential rotation is inverted in the synchronization engagement control process.

7. The power transmission control device according to claim 6, wherein the control unit controls an absolute value of a differential rotation change rate corresponding to a change amount per unit time of the differential rotation to be a predetermined value at a time of inverting the sign of the predetermined differential rotation until the transition to the power transmission state after the transition to the contact state and allowing the differential rotation to match the predetermined differential rotation in the synchronization engagement control process.

8. The power transmission control device according to claim 1,
wherein the control unit controls an absolute value of a differential rotation change rate corresponding to a change amount per unit time of the differential rotation to be a predetermined value at a time of inverting the sign of the predetermined differential rotation until the transition to the power transmission state after the transition to the contact state and allowing the differential rotation to match the predetermined differential rotation in the synchronization engagement control process.

9. A power transmission control device for a vehicle comprising:
a first rotation shaft;
a power source which is provided to adjust a rotation speed of the first rotation shaft;
a second rotation shaft configured to rotate together with an axle;
a first rotation speed detection unit which detects the rotation speed of the first rotation shaft;
a second rotation speed detection unit which detects a rotation speed of the second rotation shaft;
an engagement member that rotates together with any one shaft of the first rotation shaft and the second rotation shaft and is provided to be movable with respect to the one shaft in an axial direction;
a target engagement member that is provided in the one shaft to be relatively rotatable and rotates together with the other shaft of the first rotation shaft and the second rotation shaft;
an actuator which is operated to move the engagement member in the axial direction; and
a control unit which is able to perform a power transmission rotation speed calculation process of calculating a power transmission rotation speed corresponding to the rotation speed of the first rotation shaft at a time of establishing a power transmission operation between the engagement member and the target engagement member on the basis of the rotation speed of the second rotation shaft detected by the second rotation speed detection unit at the time of establishing the power transmission operation between the engagement member and the target engagement member, a differential rotation calculation process of calculating a differential rotation corresponding to a rotation speed difference obtained by subtracting the power transmission rotation speed calculated in the power transmission rotation speed calculation process from the rotation speed of the first rotation shaft detected by the first rotation speed detection unit, and a synchronization engagement control process of controlling a rotation speed of the power source so that the differential rotation calculated in the differential rotation calculation process matches a predetermined differential rotation and operating the actuator so that the power transmission operation between the engagement member and the target engagement member is established after the differential rotation matches the predetermined differential rotation,
wherein an engagement/disengagement state between the engagement member and the target engagement member includes:
at least a power transmission releasing state in which no contact occurs between the engagement member and the target engagement member;
a power transmission state in which a contact between the engagement member and the target engagement member occurs and the power transmission operation is established; and
a contact state in which a contact between the engagement member and the target engagement member occurs, but the power transmission operation is not established,
wherein in a case in which the actuator is operated so as to switch the power transmission releasing state to the power transmission state,
the control unit allows the differential rotation to match the predetermined differential rotation before the transition to the contact state during the synchronization engagement control process, and changes the predetermined differential rotation before the transition to the power transmission state after the transition to the contact state and allows the differential rotation to match the changed predetermined differential rotation and
wherein the control unit repeats the inverting of the sign of the predetermined differential rotation whenever a predetermined time elapses after the predetermined differential rotation is changed to a value other than zero until the transition to the power transmission state after the transition to the contact state and allows the differential rotation to match the predetermined differential rotation at the time of inverting the sign of the predetermined differential rotation in the synchronization engagement control process.

10. The power transmission control device according to claim 9,
wherein the control unit controls an absolute value of a differential rotation change rate corresponding to a change amount per unit time of the differential rotation to be a predetermined value at the time of allowing the differential rotation to match the predetermined differential rotation after inverting the sign of the predetermined differential rotation and changing the predetermined differential rotation to a value other than zero until the transition to the power transmission state after the transition to the contact state in the synchronization engagement control process.

11. A power transmission control device for a vehicle comprising:
a first rotation shaft;
a power source which is provided to adjust a rotation speed of the first rotation shaft;
a second rotation shaft configured to rotate together with an axle;
a first rotation speed detection unit which detects the rotation speed of the first rotation shaft;
a second rotation speed detection unit which detects a rotation speed of the second rotation shaft;
an engagement member that rotates together with any one shaft of the first rotation shaft and the second rotation shaft and is provided to be movable with respect to the one shaft in an axial direction;
a target engagement member that is provided in the one shaft to be relatively rotatable and rotates together with the other shaft of the first rotation shaft and the second rotation shaft;

an actuator which is operated to move the engagement member in the axial direction; and a control unit which is able to perform a power transmission rotation speed calculation process of calculating a power transmission rotation speed corresponding to the rotation speed of the first rotation shaft at a time of establishing a power transmission operation between the engagement member and the target engagement member on the basis of the rotation speed of the second rotation shaft detected by the second rotation speed detection unit at the time of establishing the power transmission operation between the engagement member and the target engagement member, a differential rotation calculation process of calculating a differential rotation corresponding to a rotation speed difference obtained by subtracting the power transmission rotation speed calculated in the power transmission rotation speed calculation process from the rotation speed of the first rotation shaft detected by the first rotation speed detection unit, and a synchronization engagement control process of controlling a rotation speed of the power source so that the differential rotation calculated in the differential rotation calculation process matches a predetermined differential rotation and operating the actuator so that the power transmission operation between the engagement member and the target engagement member is established after the differential rotation matches the predetermined differential rotation, wherein an engagement/disengagement state between the engagement member and the target engagement member includes:

at least a power transmission releasing state in which no contact occurs between the engagement member and the target engagement member;

a power transmission state in which a contact between the engagement member and the target engagement member occurs and the power transmission operation is established; and a contact state in which a contact between the engagement member and the target engagement member occurs, but the power transmission operation is not established, wherein in a case in which the actuator is operated so as to switch the power transmission releasing state to the power transmission state, the control unit allows the differential rotation to match the predetermined differential rotation set to a value other than zero before the transition to the contact state in the synchronization engagement control process, and after the transition to the contact state, the control unit allows the differential rotation to decrease to zero and switches the contact state to the power transmission state while a sign is inverted.

* * * * *